(12) United States Patent
Mizuba et al.

(10) Patent No.: US 10,125,733 B1
(45) Date of Patent: Nov. 13, 2018

(54) FUEL INJECTOR CLIP

(71) Applicant: Hitachi Automotive Systems Americas, Inc., Harrodsburg, KY (US)

(72) Inventors: Malcolm Mizuba, Farmington Hills, MI (US); Steven J. Miller, Plymouth, MI (US); Yasuo Namaizawa, West Bloomfield, MI (US); Shannon Jones, Nicolasville, KY (US); Jeff Rohrback, Danville, KY (US); Anthony Boone, Westland, MI (US)

(73) Assignee: Hitachi Automotive Systems Americas, Inc., Harrodsburg, KY (US)

( * ) Notice: Subject to any disclaimer, the term of this patent is extended or adjusted under 35 U.S.C. 154(b) by 0 days.

(21) Appl. No.: 15/701,955

(22) Filed: Sep. 12, 2017

(51) Int. Cl.
  *F02M 61/14* (2006.01)
  *F16B 21/18* (2006.01)
(52) U.S. Cl.
  CPC ............. *F02M 61/14* (2013.01); *F16B 21/18* (2013.01); *F02M 2200/853* (2013.01); *F02M 2200/856* (2013.01); *F02M 2200/857* (2013.01)
(58) Field of Classification Search
  CPC ............. F02M 61/14; F02M 2200/856; F02M 2200/857; F16B 21/18
  USPC ........................................................ 123/470
  See application file for complete search history.

(56) References Cited

U.S. PATENT DOCUMENTS

| | | | |
|---|---|---|---|
| 5,901,688 A * | 5/1999 | Balsdon ............. | F02M 25/0836 123/470 |
| 8,646,434 B2 | 2/2014 | Harvey et al. | |
| 8,813,722 B2 | 8/2014 | Harvey et al. | |
| 2006/0137659 A1* | 6/2006 | Zdroik ................. | F02M 55/005 123/470 |
| 2009/0173317 A1* | 7/2009 | Doherty ............... | F02M 55/004 123/470 |
| 2010/0218743 A1* | 9/2010 | Marc .................... | F02M 55/025 123/470 |
| 2012/0031997 A1* | 2/2012 | Harvey ................ | F02M 55/005 239/289 |

* cited by examiner

*Primary Examiner* — Mahmoud Gimie
(74) *Attorney, Agent, or Firm* — Mattingly & Malur, PC

(57) ABSTRACT

In some examples, a clip prevents relative rotation between a fuel injector and an injector cup of a fuel rail. For instance, the fuel injector may be rotated following insertion into the injector cup to prevent removal of the fuel injector. The clip includes a clip body having a pair of arms extending from the clip body with an opening between the arms for receiving the fuel injector. A tab extends from the clip body into the opening for engaging a first alignment slot in the injector cup and a second alignment slot in the fuel injector when the clip is installed on the fuel injector. Following installation of the clip on the fuel injector, the tab is disposed in the first and second alignment slots to prevent relative rotation between the fuel injector and the injector cup.

16 Claims, 7 Drawing Sheets

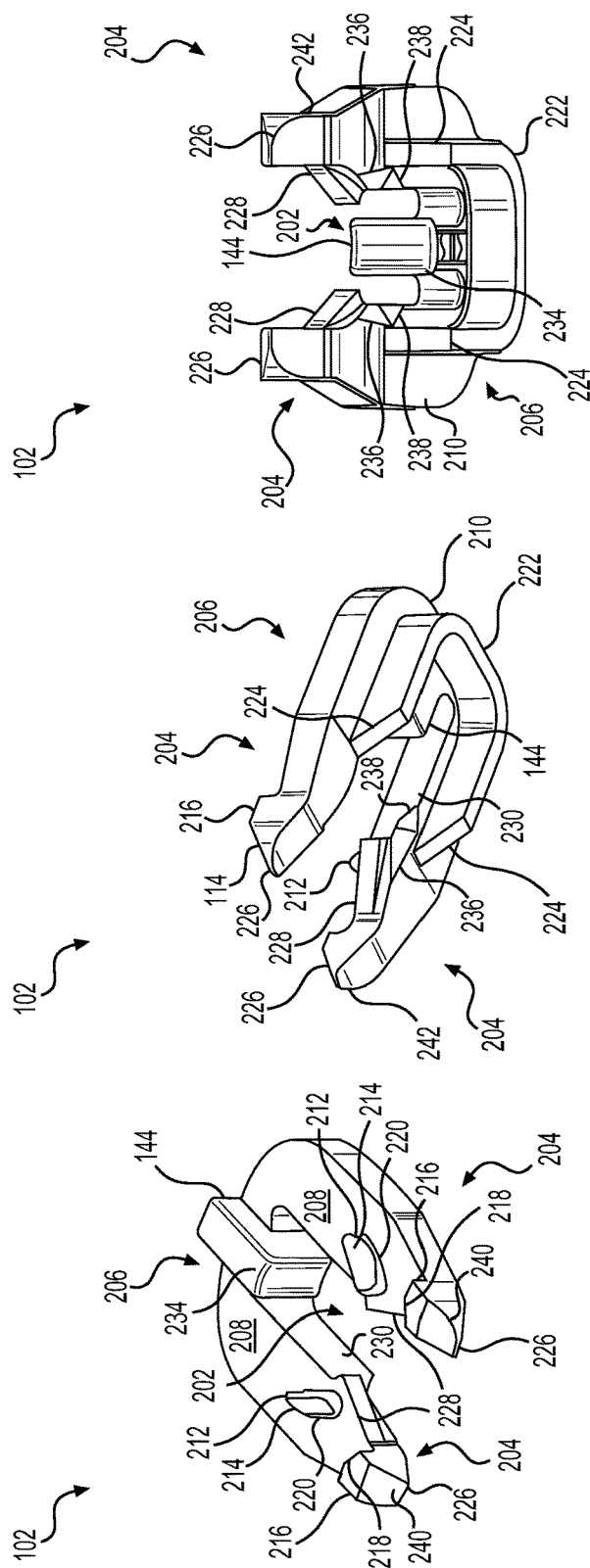

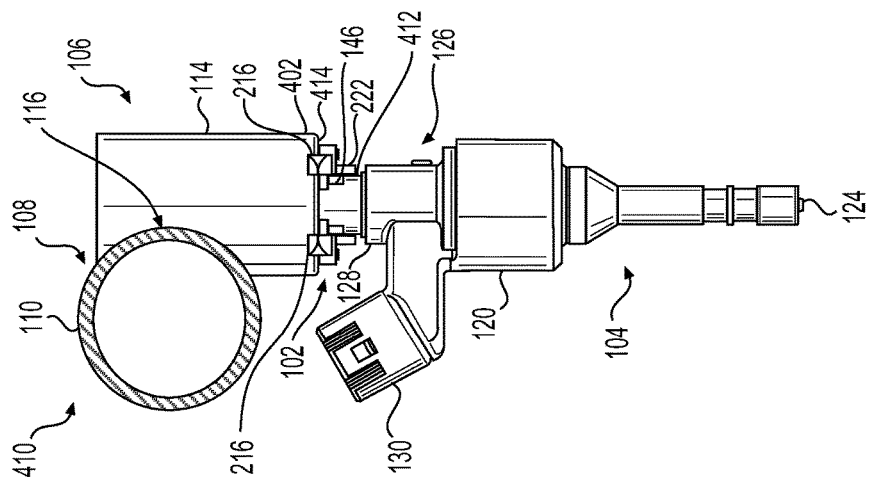
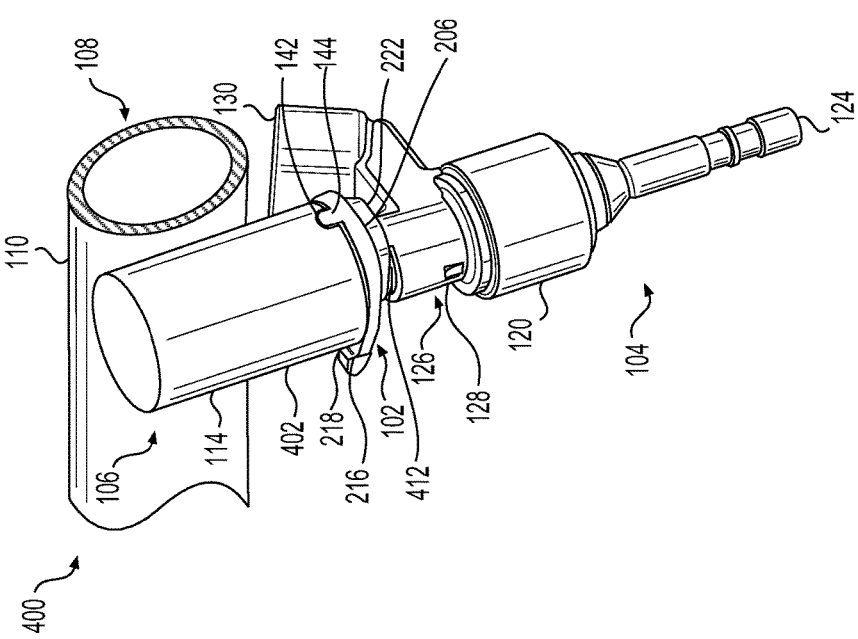
FIG. 4A
FIG. 4B

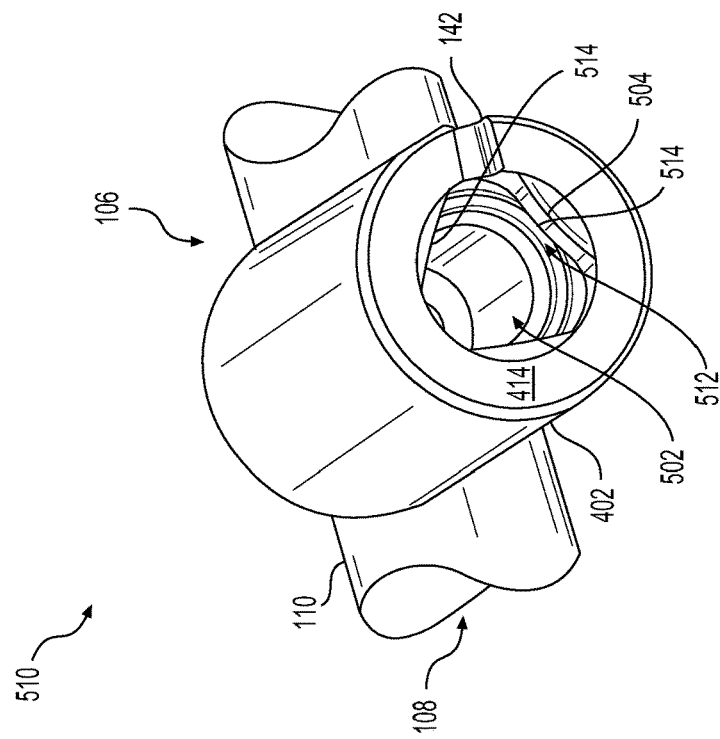
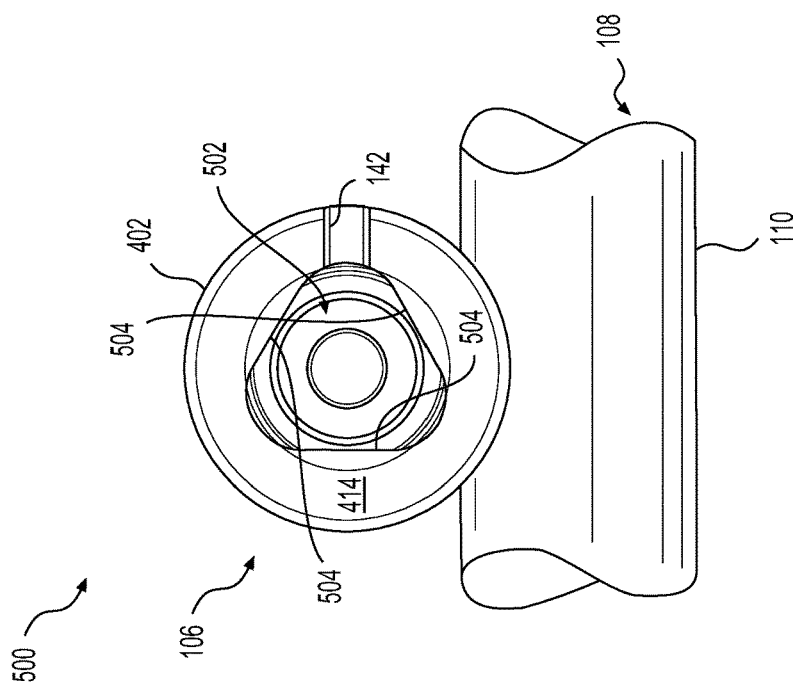

US 10,125,733 B1

FUEL INJECTOR CLIP

BACKGROUND

Fuel rails for fuel-injected engines typically include tubular structures having multiple fuel injector receptacles referred to as injector cups. Fuel injectors are installed into the injector cups and are operated for injecting fuel into the combustion chambers of an engine. For example, each fuel injector may be associated with a respective combustion chamber of the engine. Further, each fuel injector may be in fluid communication with an interior of the fuel rail through a port in the injector cup. The fuel in the interior of the fuel rail may be maintained under high pressure. The fuel injectors are opened and closed in timing with the reciprocation of the engine to inject fuel into the respective combustion chambers at a desired time.

Because the fuel in the fuel rail is maintained under high pressure, it is desirable for the fuel injectors to be securely mounted to the fuel rail. Further, precise injector orientation may be desired for proper engine operation and emissions control. Conventional injector mounting techniques may allow an injector to rotate in the fuel rail assembly, such as during shipping, e.g., from being bumped, shaken, dropped, or the like. For instance, if an injector is rotated away from its specified position, the pattern and orientation at which fuel is sprayed into the combustion chamber may change, resulting in engine performance anomalies.

SUMMARY

Some implementations include arrangements and techniques for a clip for a fuel injector. In some examples, the clip is configured to prevent relative rotation between the fuel injector and an injector cup of a fuel rail. For instance, the fuel injector may be rotated following insertion into the injector cup to prevent removal of the fuel injector from the injector cup. The clip includes a clip body having a pair of arms extending from the clip body with an opening between the arms for receiving the fuel injector. A tab extends from the clip body into the opening for engaging a first alignment slot in the injector cup and a second alignment slot in the fuel injector when the clip is installed on the fuel injector. Following installation of the clip on the fuel injector, the tab is disposed in the first and second alignment slots to prevent relative rotation between the fuel injector and the injector cup.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2A illustrates an example isometric view of a clip according to some implementations.

FIG. 2B illustrates an example isometric view of a clip according to some implementations.

FIG. 2C illustrates an example isometric view of a clip according to some implementations.

FIG. 4A illustrates an example enlarged isometric view of the fuel injector installed in the injector cup with the clip installed according to some implementations.

FIG. 4B illustrates an example enlarged side view of the fuel injector installed in the injector cup with the clip installed according to some implementations.

FIG. 5A illustrates an example bottom view of the injector cup showing the cup opening according to some implementations.

FIG. 5B illustrates an example isometric view of the injector cup showing the cup opening according to some implementations.

DETAILED DESCRIPTION

Figure 1:
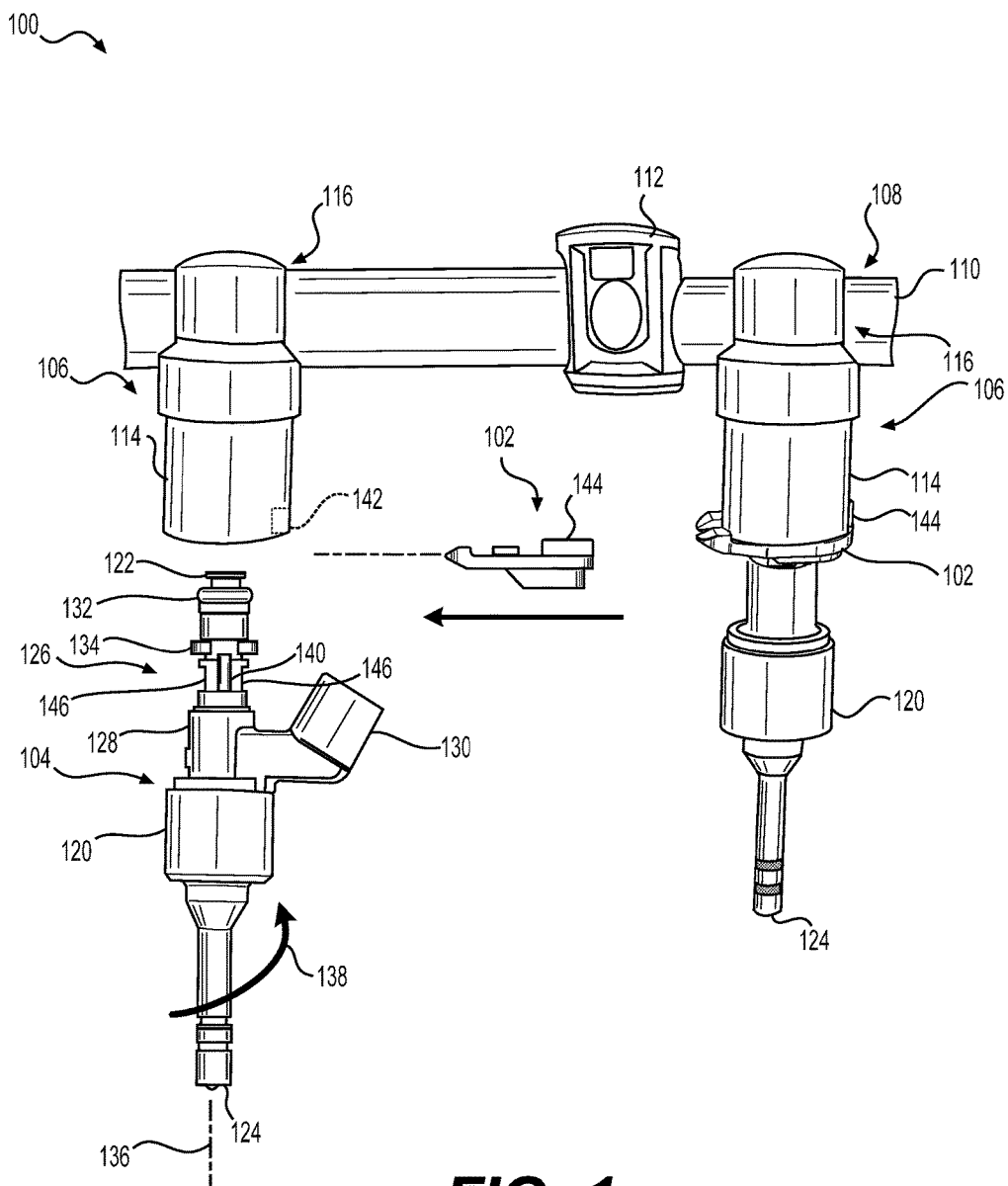
FIG. 1 illustrates an example fuel injector rail assembly according to some implementations.

The technology herein includes novel arrangements and techniques for assembling a fuel injector to a fuel rail. Some examples include a clip for retaining the fuel injector installed within an injector cup of the fuel rail. The clip may be generally U-shaped and may include a center key tab that prevents relative rotation between the fuel injector and the injector cup when the clip is installed on the fuel injector. Thus, the clip prevents the injector from rotating relative to the injector cup, such as during shipping, or the like, e.g., until installation to the engine. Consequently, some examples provide an improvement over conventional designs that do not retain the fuel injector as effectively and/or in which the position of the injector relative to the injector cup is less precisely controlled. For example, unlike some conventional techniques, implementations herein do not require engagement with a part of the injector's electrical connector for preventing rotation.

The fuel injector may be inserted into the injector cup, and may be rotated following insertion so that the injector is securely retained in the injector cup. As one example, the injector cup may include a retaining shelf that contacts a retaining member on the fuel injector. The retaining member is inserted past the retaining shelf of the injector cup and the fuel injector is rotated to an installed position so that contact between the retaining member and the retaining shelf prevents removal of the fuel injector from the injector cup. When the injector is rotated to the correct position, an alignment slot in the injector cup is aligned with an alignment slot in the fuel injector.

The clip may then be installed onto the injector stem and a key tab portion of the clip enters into an alignment slot formed in the injector cup and the alignment slot the fuel injector stem. The arms of the clip are designed to flex and lock in place on the installed injector by an interference fit between a plurality of features on the clip and a plurality of features on the fuel injector and injector cup, which enables the clip to be removed and reused if necessary. With the clip mounted onto the fuel injector, relative rotation between the fuel injector and the injector cup is securely prevented by the key tab portion of the clip, while the clip is securely retained by interaction of features of the clip with the fuel injector and the injector cup.

The clip is generally horseshoe-shaped or otherwise U-shaped including a pair arms extending from a curved body that includes a center key tab. The arms are generally parallel to each other when viewed in plan and form an opening between them for receiving the fuel injector stem. The clip further includes a support wall to strengthen the clip body for increased robustness during installation on the injector, while also providing lateral support to the injector following installation of the clip. The clip may further include barb-like features for gripping the injector surface for securing and retaining the clip to the injector. Further, the clip may include sloped ramps on an inner surface of each arm, which enable easier installation of the clip with a lower applied force than if the ramps were not included. Due to the inclusion of the center key tab, the clip can prevent rotation of the injector relative to injector cup without relying on engagement with the injector's electrical connector.

As mentioned above, the key tab fits into an alignment slot formed in a plastic overmold on the stem of the fuel injector, although engaging with any type of sufficiently rigid material on the fuel injector is acceptable. The key tab has chamfered edges on the side edges of the front face. The chamfers allow for easier installation into the alignment slots on the fuel injector and the injector cup, when aligned, and reduce the chance of damaging the clip during installation. The clip arms have a plurality of features for facilitating installation and/or preventing unintended removal of the clip, including injector barbs, cup tabs, overmold ramps, arm tip tabs, and the support wall.

The cup tabs are located on the upper face of the clip on the clip arms. The cup tabs are designed to fit into the injector cup and make contact with the side walls of the injector cup for anti-rotation support and for retaining the clip in the installed position. The cup tabs have a sloped forward face to allow the clip to slide over the end face of the injector cup and enter into the cup opening. When the cup tabs are positioned inside the opening of the injector cup, spreading of the clip arms is inhibited because the cup tabs have very minimum distance and/or contact the interior wall of the cup opening. For example, if a force is applied to cause the clip arms to begin to spread, the cup tabs help prevent any additional spreading by contacting the interior wall of the injector cup opening. One possible source of the clip arms spreading may be when the injector is rotated, causing the injector overmold to push the arms apart. Because the potential for arm spreading is greatly reduced by the cup tabs, the potential rotation of the injector is also reduced.

The support wall may extend from the bottom surface of the body of the clip extending around the bottom surface of the body in a U-shape from one arm to the other. The support wall adds spreading strength to the body of the clip to prevent breaking of the body when the arms are spread during installation or removal of the clip. Thus, the support wall adds robustness to the clip body to enable reuse of the clip. Another benefit of the support wall is to reduce the amount of tilt the injector can experience by providing lateral support to the injector stem following installation of the clip onto the fuel injector.

The injector barbs are located on the inner surface of the clip arms and extend into the opening of the clip. When the clip is installed on the injector stem, the injector barbs provide a retaining action to grip the injector stem. For example, the arms are still able to spread open during installation and removal of the clip, but the injector barbs extend the contact of the arms on the injector stem surface, increasing the required spreading distance and spreading force before releasing the clip from the fuel injector. This increased spreading distance helps to inhibit the clip from removing itself from the fuel injector, such as due to rotation of the injector or other force applied to the clip.

The overmold ramps are molded into the inner surface of the clip arms. The overmold ramps assist during clip installation by allowing a gradual, sloped path for the injector stem overmold and clip to interact. During installation, the clip support wall, injector barbs, and the overmold ramps on the inner surface of the clip arms and body interact with the injector overmold on the injector stem. This causes the clip arms to spread open. However, to allow the installation and proper seating of the cup tabs, it is desirable to minimize the spreading of the clip arms during installation. The overmold ramps help reduce the amount of initial contact with the section of the injector overmold that causes arm spreading, which allows the cup tabs to insert into the injector cup and avoid getting caught on the bottom face of the injector cup, thereby preventing improper installation of the clip.

The arm tips are located at the end of the clip arms. The arm tips are angled on two sides to a point to allow easier installation of the clip. The pointed arm tips allow the clip to slide over the bottom surface of the injector cup and past the injector overmold. The arm tips are designed to avoid catching on any part during the installation of the clip onto the assembled fuel injector and injector cup. The top face of the arm tip includes an upwardly projecting tip tab having a chamfered edge that contacts the injector cup outer wall following installation of the clip to assist in retaining the clip in the installed position and further inhibiting removal of the clip.

For discussion purposes, some example implementations of a clip for a fuel injector are described in the environment of a fuel injector that is retained in an injector cup of a fuel rail. However, implementations herein are not limited to the particular examples provided, and may be extended to other service environments and to other applications, as will be apparent to those of skill in the art in light of the disclosure herein.

FIG. 1 illustrates an example fuel injector rail assembly 100 according to some implementations. In this example, a clip 102, as discussed above, may be used to secure a fuel injector 104 into an injector cup 106 integral with a fuel rail 108. The fuel rail 108 includes a hollow tubular body 110 that is filled with pressurized fuel during operation of the fuel system of an engine (not shown in FIG. 1). For example, the fuel rail 108 may be constructed from stainless steel or other durable material able to withstand high internal pressures. The fuel rail 108 may include one or more of the injector cups 106 integral with or otherwise attached to the tubular body 110, such as spaced along the length of the tubular body 110. For example, there may be three or four of the injector cups 106 mounted along the length of the fuel rail 108. In addition, one or more connection lugs 112 may also be integral with or otherwise attached to the tubular body 110 such as to enable mounting of the fuel rail to the engine.

Each injector cup 106 may have a cylindrical or otherwise tubular body 114 having a hollow interior that is in fluid communication with the interior of the fuel rail 108 through a fuel port (not shown in FIG. 1) located inside the injector cup 106 at a connection 116 between the injector cup 106 and the fuel rail 108. The injector cup 106 serves as a receptacle for receiving the fuel injector 104. Accordingly, when the fuel injector 104 is installed inside the injector cup 106, the fuel is able to pass from the interior of the fuel rail 108, through the port to the injector cup 106, and into the fuel injector 104.

The fuel injector 104 includes an injector body 120, an inlet end 122, and an outlet end 124. The fuel injector 104 further includes an injector stem portion 126 located between the injector body 120 and the inlet end 122. The stem portion 126 includes an injection molded overmold portion 128 of a polymer material that encompasses a metal stem (not visible in FIG. 1) and an electrical connector 130. The electrical connector 130 extends from one side of the fuel injector 104 for connecting to the electrical system of the vehicle following installation of the fuel rail assembly 100 to the engine. For example, electrical signals may be provided through the electrical connector 130 for opening and closing the fuel injector 104 during operation of the engine. The injector 104 may further include an O-ring 132 located at the inlet end 122 for forming a seal with the interior of the injector cup 106 when the fuel injector 104 is installed into the injector cup 106.

In addition, the fuel injector 104 includes a retaining member 134 mounted on the stem portion 126 of the fuel injector 104. To install the fuel injector 104 into the injector cup 106, the fuel injector 104 is inserted into the injector cup 106 and rotated about an injector centerline 136 (e.g., a centerline 136 passing through the inlet end and outlet end). Thus, as indicated by arrow 138, following insertion into the injector cup, the fuel injector is rotated, such as ⅙ of a turn, ⅛ of a turn, ¼ of a turn, or the like, to a desired installed position. Following rotation of the fuel injector 104, the electrical connector 130 may face toward one side of the fuel rail, e.g., the rear side in this illustration. For example, depending on the configuration of the retaining member 134 and a corresponding retaining shelf (not shown in FIG. 1) on the interior of the injector cup 106, the fuel injector 104 may be rotated, so that the retaining member 134 and the retaining shelf of the injector cup 106 prevent the fuel injector 104 from being withdrawn from the injector cup 106.

Following rotation of the fuel injector 104, an alignment slot 140 formed in the overmold portion 128 of the fuel injector 104 aligns with an alignment slot 142 formed through the wall of the injector cup 106. As described additionally below, when the clip 102 is installed onto the fuel injector stem 126 following insertion of the fuel injector 104 into the injector cup 106, a key tab 144 included on the clip 102 enters into the alignment slot 142 of the injector cup 106 and also into the alignment slot 140 of the fuel injector 104. Accordingly, following installation of the clip onto the fuel injector, the key tab 144 is located within the alignment slots 140 and 142, and is thereby able to maintain the fuel injector 104 in a fixed position relative to the injector cup 106, which prevents relative rotation between the fuel injector 104 and the injector cup 106, and which therefore prevents removal of the fuel injector 104 from the injector cup 106.

In addition, the stem portion 126 includes cutout grooves 146 formed on two sides of the stem portion 126 under the retaining member 134. When the clip 102 is installed onto the fuel injector stem 126, the arms of the clip 102 are inserted into the grooves 146 for receiving the clip 102 during installation of the clip 102. The grooves 146 prevent movement of the clip in an axial direction along the centerline 136 of the fuel injector 104, and thus, maintain the upper surface of the clip 102 in contact with the injector cup 106 for ensuring engagement of the cup tabs and the tip tabs with the injector cup 106, as discussed additionally below.

FIGS. 2A-2C illustrate several example isometric views of an example clip 102 according to some implementations. The clip 102 may be formed of a durable material such as injection molded nylon, various other types of polymers or monomers, fiberglass/resin or other composite materials, metal, or other suitable materials, as will be apparent to those of skill in the art having the benefit of the disclosure herein.

FIG. 2A illustrates an example isometric view of a topside of the clip 102 according to some implementations. FIG. 2B illustrates an example isometric view of a bottom side of the clip 102 according to some implementations. FIG. 2C illustrates an example isometric view of the bottom side of the clip 102, viewing an opening 202 of the clip 102 according to some implementations. As mentioned above, the clip 102 includes a pair of generally parallel clip arms 204 that extend from a rounded clip body 206 to give the clip 102 a generally U-shaped configuration with the opening 202 located between the clip arms 204. The clip body 206 and clip arms 204 include an upper surface 208 and a bottom surface 210, with the key tab 144 extending upward from the upper surface 208 and outward from the body 208 into the opening 202. The key tab 144 is generally box-shaped, having a rectangular cross-section in front, top and side views.

An injector cup tab 212 extends from the upper surface 208 of each arm 204 at locations which will allow the cup tabs 212 hold onto or otherwise contact the injector cup (not shown in FIGS. 2A-2C) from the inside wall, as discussed additionally below, when the clip is installed on the fuel injector following installation of the fuel injector into the injector cup. The injector cup tabs 212 include a chamfered or otherwise sloped forward surface 214 to enable the injector cup tabs 212 to slip into the injector cup opening and line up adjacent to the inner wall of the injector cup opening.

Furthermore, the arms 204 each include an arm tip tab 216, which extends upward from the upper surface 208 at the end of each arm 204. Each arm tip tab 216 includes a chamfered surface 218, which is located adjacent to, contacts, or otherwise engages with the exterior wall of the injector cup when the clip is installed to provide an opposing, locking force opposite to the injector cup tabs 212 for maintaining the clip 102 in the installed position when installed on the fuel injector an in contact with the injector cup (not shown in FIGS. 2A-2C).

As mentioned above, the forward surface 214 of each cup tab 212 is chamfered or otherwise sloped to enable the clip 102 to slide under a bottom surface of the injector cup during installation of the clip 102. When the clip 102 slides into place on the fuel injector, the cup tabs serve to help lock the clip 102 into place by contacting the inside wall of the injector cup opening or otherwise being located closely adjacent to the inside wall. In addition, the cup tabs 212 include a relatively short vertical wall 220 between the sloped forward surface 214 and the upper surface 208 of the arm 204. The vertical wall 220 on the front side of the cup tab 212 provides the cup tab 212 with a better hold on the interior wall of the injector cup opening when the clip 102 is installed. For example, without the vertical wall 220, the cup tab 212 may be able to slip too far forward during installation of the clip and/or may not provide a desired amount of hold on the injector cup, such as allowing clip 102 to slip out too easily. Accordingly, the vertical wall 220 is sized to be tall enough to provide support for maintaining the clip 102 in position following installation, but short enough to enable the clip 102 to be installed without requiring an excessive amount of force or otherwise causing excessive interference during installation.

In addition, as illustrated in FIGS. 2B and 2C, the clip 102 includes a U-shaped support wall 222 extending from the bottom surface 210 of the body 206 and arms 204 of the clip 102, traversing around the body 206 from one arm to the other arm. The support wall 222 adds strength to the body 206 of the clip 102, such as for preventing the body 206 of the clip 102 from cracking during installation. Thus, the support wall 222 improves the structural integrity of the clip 102 when the arms 204 are spread during installation. The support wall 222 also adds support between the fuel injector and the injector cup. For example, the injector overmold has a stepped down area that the clip support wall 222 contacts following installation of the clip 102. The support wall 222 laterally supports the fuel injector with respect to the injector cup to help prevent tilting of the fuel injector in the direction of the support wall 222.

The support wall 222 further includes sloped front edges 224 facing toward arm tips 226 of the arms 204, i.e., toward the open end of the clip 102, for ease of installation purposes. For example, the sloped front edges 224 allow the clip 102 to slide onto the fuel injector and help guide the clip 102 into the desired location while the support wall 222 helps reduce the spreading of the arms 204. When the clip 102 slides into place over the cutout grooves in the overmold, as discussed additionally below, the clip arms 204 initially spread and then retract back together sufficiently for the cup tabs 212 to insert themselves into the interior of the injector cup opening.

In addition, the arms 204 each include an injector barb 228 that extends inward from an inner surface 230 of each arm into the opening 202. The injector barbs 228 add greater retention friction to the clip 102. For example, during unintended injector rotation, the clip arms 204 may try to spread open due to a force exerted by the overmold. The injector barbs 228 add increased grip and increased injector contact surface area to the clip 102. The injector barbs 228 in combination with the cup tabs 212 greatly reduce the likelihood of the arms 204 of the clip 102 spreading apart, and therefore prevent the clip 102 from popping off the fuel injector. The injector barbs 228 are configured to partially wrap around the injector surface when the clip 102 is installed on the fuel injector. Each injector barb 228 has a longer forward slope and shorter rear slope to make installation of the clip 102 easier and to make removal of the clip 102 more difficult.

The key tab 144 includes chamfered edges 234 on the forward facing portion of the key tab 144. All of the forward facing edges 234 may be chamfered, e.g., at 45 degrees, to reduce the chance of shaving when the key tab 144 is inserted into the alignment slots in the injector cup and the fuel injector. For instance, the chamfered edges 234 allow for a smoother insertion of the key tab 144 into the alignment slots.

Overmold ramps 236 and 238 are formed on the inner surface 230 of the clip arms 204 for installation assistance. The overmold ramps 236 and 238 allow the clip 102 to slide more easily over the injector stem such that the spreading the arms 204 during installation of the clip is less than if the overmold ramps 236 and 238 were not present. During installation, reducing the spreading of the clip arms 204 allows for an easier installation with lower applied force and more consistent engagement of the clip features, so that the cup tabs 212, the arm tip tabs 216, and the support wall 222 engage in their desired locations. A forward overmold ramp 236 has an upward slope to assist the cup tabs 212 in passing under the bottom surface of the injector cup during installation. A rear overmold ramp 238 has a downward slope, which assists the final installation of the clip 102 by pushing the arm tip tabs 216 of the clip 102 upward to engage the outer wall of the injector cup.

As mentioned above, the arm tip tabs 216 engage with the outer wall of the injector cup to helping maintain the clip 102 on the fuel injector and injector cup when installed. The arm tip tabs 216 add outer support to the injector cup, which compliments the inner support of the cup tabs 212. The clip arm tips 226 are pointed with a gradual slope on an upper forward surface 240 and another gradual slope on a lower forward surface 242 to enable easier installation onto the fuel injector and injector cup. For example, the upper forward slope 240 pushes the front of the clip 102 under the injector cup bottom surface and prevents the clip 102 from getting caught on the injector cup during installation of the clip 102.

Figure 3B:
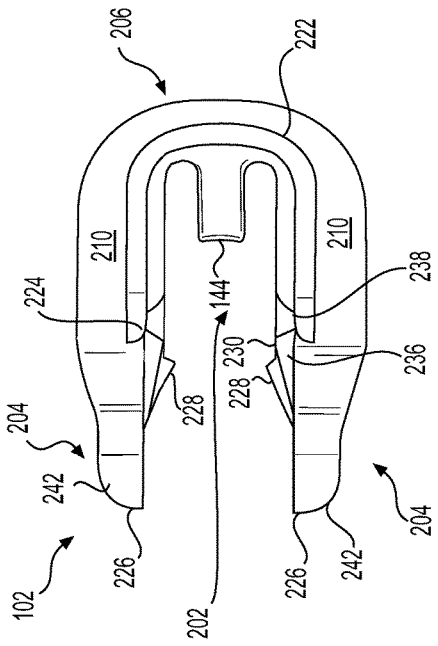
FIG. 3B illustrates an example bottom view of the clip of FIG. 3A according to some implementations.
Figure 3D:
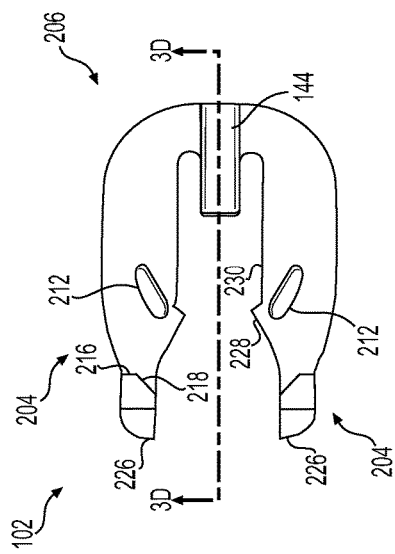
FIG. 3D illustrates an example cross-sectional view of the clip of FIG. 3C, taken along line 3D-3D according to some implementations.
Figure 3A:
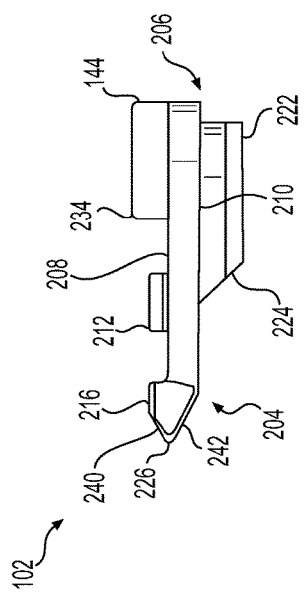
FIG. 3A illustrates an example side view of a clip according to some implementations.

FIGS. 3A-3D illustrate additional views of the clip 102 according to some implementations. FIG. 3A illustrates an example side view of the clip 102 according to some implementations. For example, FIG. 3A illustrates the support wall 222 extending downward from the lower surface 210 of the clip body 206 and clip arms 204, and further illustrates the cup tabs 212 and the arm tip tabs 216 extending upward from the upper surface 208 of the arms 204.

Furthermore, FIG. 3B illustrates an example bottom view of the clip 102 of FIG. 3A according to some implementations. For example, FIG. 3B illustrates the support wall 222 extending in a U shape around the body 206 and onto the arms 204 of the clip 102. Furthermore, FIG. 3B illustrates the opening 202 between the clip arms 204, and further illustrates the key tab 144 extending into the opening 202. FIG. 3B also illustrates the injector barbs 228 extending into the opening 202, and the location of the overmold ramps 236 and 238 formed on the inner surfaces 230 of the arms 204.

Figure 3C:
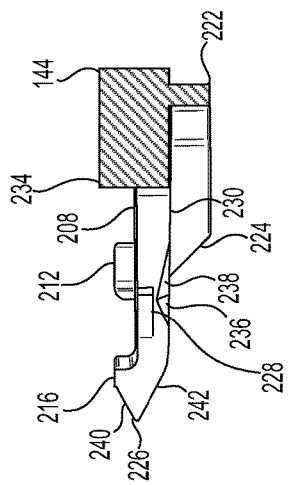
FIG. 3C illustrates an example top view of the clip of FIG. 3A according to some implementations.

Additionally, FIG. 3C illustrates an example top view of the clip 102 of FIG. 3A according to some implementations. For example, FIG. 3C illustrates the position of the cup tabs 212 on the arms 204 and the relative location of the cup tabs 212 with respect to the arm tip tabs 216 and the chamfered surface 218 thereof.

FIG. 3D illustrates an example cross-sectional view of the clip 102 of FIG. 3C, taken along line 3D-3D according to some implementations. For example, the key tab 144 is illustrated as being generally rectangular in cross-section with the support wall 222 extending downward therefrom. In addition, FIG. 3 D illustrates the location of the overmold ramps 236 and 238 with respect to the cup tab 212 and the injector barb 228.

FIGS. 4A and 4B illustrate several enlarged views of the fuel injector 104 installed in the fuel rail 108 and retained by the clip 102 according to some implementations. FIG. 4A illustrates an example enlarged isometric view 400 of the fuel injector 104 installed in the injector cup 106 with the clip 102 fully installed according to some implementations. For example, the injector clip 102 is installed on the stem 126 of the fuel injector 104. In this position, the key tab 144 of the clip 102 is situated inside the alignment slot 142 of the injector cup 106 and also in the alignment slot 140 of the fuel injector (not visible in FIG. 4A). For example, if the alignment slot 142 of the injector cup 106 is not in alignment with the alignment slot 140 of the fuel injector, it is not possible to fully install the clip 102 onto the fuel injector 104. Accordingly, a technician or other person installing the clip 102 would have to ensure that the fuel injector 104 is rotated to the correct position (i.e., so that the alignment slots 140 and 142 are aligned) in order to install the clip 102 onto the fuel injector 104 and the injector cup 106. Further, as also illustrated in FIG. 4A, when the clip 102 is fully installed, the chamfered surface 218 of the arm tip tab 216 is engaged with an outer wall 402 of the injector cup 106.

FIG. 4B illustrates an example enlarged side view 410 of the fuel injector 104 installed in the injector cup 106 with the clip 102 fully installed according to some implementations. This view illustrates the grooves 146 in the overmold portion for receiving the clip arms 204, and further illustrates a stepped down area 412 formed in the overmold portion 128. For example, the stepped down area 412 in the overmold portion 128 is contacted by the clip support wall 222 following installation of the clip 102. The support wall 222 supports the fuel injector 104 laterally to help prevent tilting of the fuel injector in either direction of the support wall 222. Thus, the support wall 222 adds lateral support between the fuel injector 104 and the injector cup 106, as well as adding strength to the body of the clip 102.

Furthermore, FIG. 4B illustrates that the arm tip tabs 216 extend upward above a bottom surface 406 of the injection cup 106. Accordingly, the arm tip tabs 216 extend high enough above the upper surface of the clip 102 to engage with the outer wall 402 of the injector cup 106, thereby acting to help retain the clip 102 in the installed position.

FIGS. 5A and 5B illustrate several end views of the injector cup on the fuel rail 108 according to some implementations. FIG. 5A illustrates an example bottom end view 500 of the injector cup 106 showing a cup opening 502 according to some implementations. In this example, the cup opening 502 is in the shape of a rounded triangle having three sidewalls 504 that extend outward into the cup opening 502. As discussed additionally below, the retaining member 134 on the fuel injector 104 (not shown in FIG. 5A) may have a complementary rounded triangular shape that fits within the three sidewalls 504 forming the opening 502. Furthermore, FIG. 5 illustrates the location of the alignment slot 142 formed in the bottom surface 414 of the injector cup 106.

FIG. 5B illustrates an example isometric view 510 of the injector cup 106 showing the cup opening 502 according to some implementations. FIG. 5B illustrates that there is an undercut 512 behind the sidewalls 504 of the opening 502. The undercut 512 is sufficiently large to receive the retaining member 134 of the fuel injector when the retaining member is inserted into the opening 502 and rotated. For example, when the retaining member is rotated, a retaining shelf 514 formed by each of the three sidewalls 504 prevents the retaining member and thereby the fuel injector from being withdrawn from the injector cup 106. Furthermore, while a triangular opening 502 is shown in this example, other shapes of openings may be used in other examples, such as square, oval, and so forth, with the retaining member on the fuel injector having a similar or otherwise complementary shape, as will be apparent to those of skill in the art having the benefit of the disclosure herein.

Figure 6B:
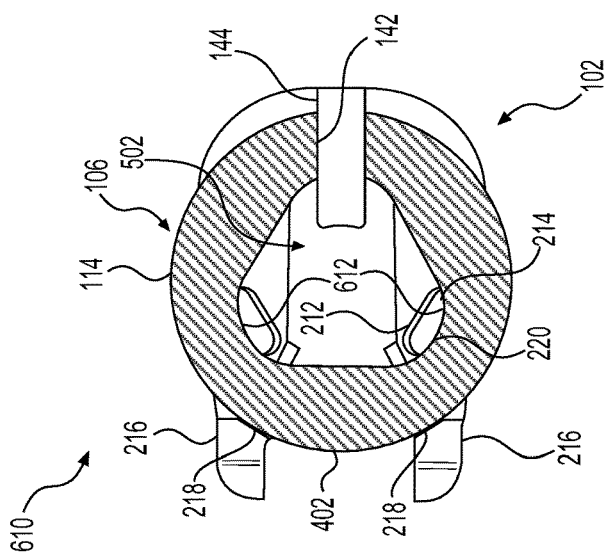
FIG. 6B is a cross-sectional view taken along line 6B-6B of FIG. 6A according to some implementations.
Figure 6A:
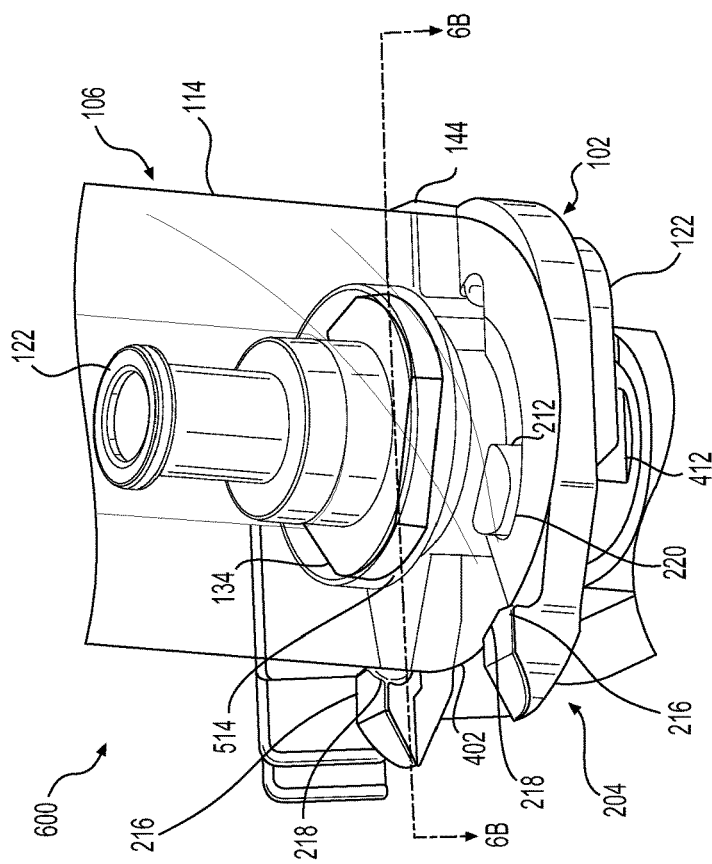
FIG. 6A illustrates an enlarged assembly view according to some implementations.

FIGS. 6A-6B illustrates several views of the fuel rail assembly according to some implementations. FIG. 6A illustrates an enlarged view 600 of the fuel rail assembly with the injector cup 106 illustrated as being transparent for clarity of illustration. Accordingly, FIG. 6 illustrates that the cup tabs 212 are engaged inside the opening of the injector cup 106 contacting or otherwise adjacent to the rounded portions of the rounded triangle forming the opening. Furthermore, the retaining member 134 is illustrated as rotated to align the alignment slot 140 of the fuel injector 104 with the alignment slot 142 of the injector cup 106. In this position, the retaining member 134 is located over the retaining shelves 514 in the injector cup 106, which prevents removal of the fuel injector 104 from the injector cup 106. Furthermore, on the exterior of the injector cup 106, the chamfered edges 218 of the end tabs 216 are engaged with the outer wall 402 of the injector cup 106.

FIG. 6B is a cross-sectional view 610 taken along line 6B-6B of FIG. 6A according to some implementations. As discussed above, when the clip 102 is installed onto the injector 104 and injector cup 106, the cup tabs 212 slip into the cup opening and line up with inner corners 612 of the cup opening 502 while the arm end tabs 216 engage the outer wall 402 of the injector cup 106 to add an opposing retaining force to that of the cup tabs 212. The front face 214 of the cup tab 212 is sloped for installation purposes, which allows the clip 102 to slide under the bottom surface of the injector cup 106 during installation. After the clip 102 slides into place on the injector 104, the cup tabs 212 lock into place inside the injector cup 106 positioned adjacent to the inner corners 612 of the cup opening 502. The vertical wall 220 below the sloped section 214 of the cup tab 212 enables the cup tab 212 to engage the injector cup 106 inner wall 612 when the clip 102 is installed. For example, without the vertical wall 220, the clip 102 may slip too far forward or not provide a sufficient hold on the injector cup 106.

Figure 7A:
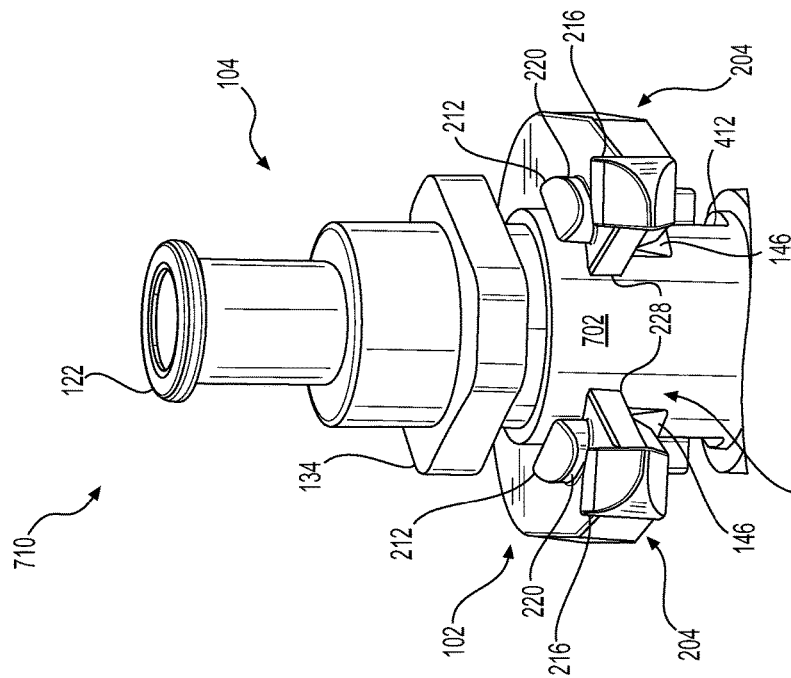
FIG. 7A illustrates an isometric view of the clip installed on the fuel injector with the injector cup not shown for clarity of illustration.
Figure 7B:
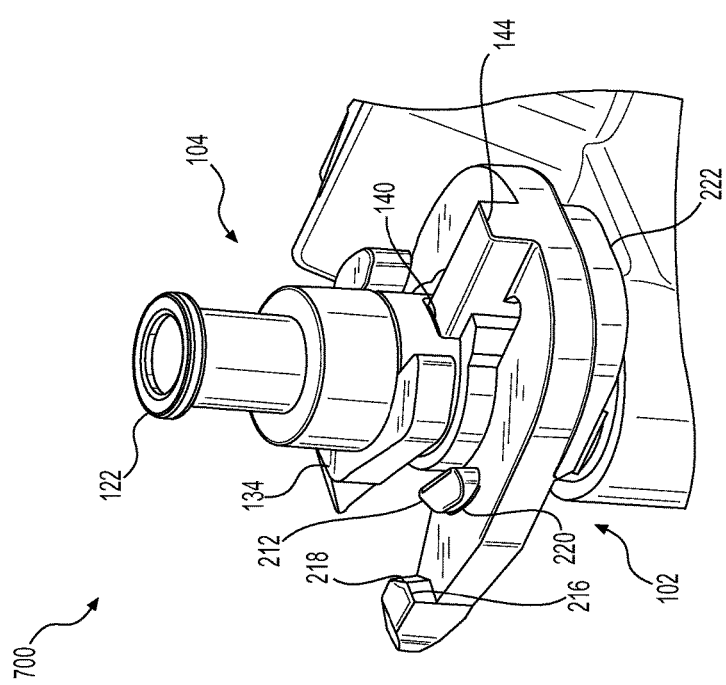
FIG. 7B illustrates an isometric view of the clip installed on the fuel injector with the injector cup not shown for clarity of illustration.

FIGS. 7A-7B illustrate several views of the clip installed on the fuel injector with the injector cup removed for clarity of illustration. FIG. 7A illustrates an isometric view 700 of the clip 102 installed on the fuel injector 104 with the injector cup not shown for clarity of illustration. In this example, when the clip 102 is fully installed onto the fuel injector 104, the key tab 144 engages with the alignment slot 140 in the injector 104. This view also illustrates one possible configuration of the retaining member 134. In this example, the retaining member 134 has a generally rounded triangular shape that corresponds to the example shape of the injector cup opening 502 discussed above with respect to FIG. 5, although other possible shapes will be apparent to those of skill in the art having the benefit of the disclosure herein.

FIG. 7B illustrates a side isometric view 710 of the clip 102 installed on the fuel injector 104 with the injector cup not shown for clarity of illustration. This view further illustrates the configuration of the retaining member 134 as having a tri-lobed configuration e.g., as a rounded triangle, or the like. In addition, this view illustrates the injector barbs 228 engaging with the injector stem 126 when the clip 102 is installed on the fuel injector 104. For example, the injector barbs 228 engage against the outer surface 702 of the injector stem 126 for increasing the frictional hold of the clip 102 on the fuel injector 104. This view further illustrates how the cutout grooves 146 receive the arms 204 of the clip 102. Accordingly, the arms 204 engage on either side of the injector stem 126 in the cutout grooves 146 for at least partially restricting motion of the clip 102 in an axial direction of the fuel injector 104.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A clip for retaining a fuel injector in an injector cup of a fuel rail, wherein the fuel injector is rotated following insertion into the injector cup to prevent removal of the fuel injector, the clip comprising:
   a clip body having a pair of arms extending from the clip body with an opening between the arms for receiving a stem of the fuel injector;
   a first tab extending from the clip body into the opening, the first tab configured for engaging a first alignment slot in the fuel injector stem and a second alignment slot in the injector cup, wherein when the clip is installed on the fuel injector, the first tab is disposed in the first alignment slot in the fuel injector stem and in the second alignment slot in the injector cup, preventing relative rotation between the fuel injector and the injector cup, and preventing removal of the fuel injector from the injector cup; and
   a respective barb extending from a surface of each arm into the opening, the respective barbs being positioned to engage an outer surface of the fuel injector when the clip is installed on the fuel injector to at least partially inhibit removal of the clip from the fuel injector.

2. The clip as recited in claim 1, further comprising a respective second tab extending from a surface of each arm in a direction of the injector cup, the respective second tabs being disposed in an opening of the injector cup when the clip is installed on the fuel injector to at least partially inhibit removal of the clip from the fuel injector.

3. The clip as recited in claim 1, further comprising a respective second tab extending from a surface at an end of each arm in a direction of the injector cup, the respective second tabs being disposed adjacent to an outer wall of the injector cup when the clip is installed on the fuel injector to at least partially inhibit removal of the clip from the fuel injector.

4. The clip as recited in claim 1, further comprising:
   a respective second tab and a respective third tab extending from a surface of each arm in a direction of the injector cup, the respective second tabs being disposed in an interior of an opening of the injector cup when the clip is installed on the fuel injector and the respective third tabs extending from an end of each arm and being disposed adjacent to an outer wall of the injector cup when the clip is installed on the fuel injector; and
   a first ramp and a second ramp formed in an inner surface of each arm, the first ramp having a first slope to assist the second tabs in passing under a bottom surface of the injector cup during installation of the clip, the second ramp having a second slope which assists the installation of the clip by pushing the third tabs into engagement with the outer wall of the injector cup.

5. The clip as recited in claim 1, further comprising a U-shaped support wall extending from the clip body and the arms in a direction away from the injector cup, wherein when the clip is installed on the fuel injector, the support wall is positioned adjacent to a stem of the fuel injector to provide lateral support to the fuel injector.

6. The clip as recited in claim 1, wherein the fuel injector includes cutout grooves formed on two sides of the fuel injector stem, the clip further comprising pointed tips on the arms to enable the arms to pass through the cutout grooves, the arms of the clip engaging the cutout grooves to inhibit movement of the clip in an axial direction of the fuel injector.

7. An apparatus comprising:
   a fuel injector configured for insertion into an injector cup, the fuel injector having a first alignment slot and the injector cup having a second alignment slot, wherein following insertion, the fuel injector is rotated to retain the fuel injector in the injector cup and the first alignment slot is aligned with the second alignment slot; and
   a clip for inhibiting relative rotation between the fuel injector and the injector cup, the clip including:
      a clip body with a pair of arms extending from the clip body and an opening between the arms for receiving the fuel injector;
      a first tab extending from the clip body for engaging with the first and second alignment slots,
      wherein, when the clip is installed on the fuel injector, the first tab is disposed in the first and second alignment slots, preventing relative rotation between the fuel injector and the injector cup;
      a respective second tab and a respective third tab extending from a surface of each arm in a direction of the injector cup, the respective second tabs being disposed in an interior of an opening of the injector cup when the clip is installed on the fuel injector and the respective third tabs extending from an end of each arm and being disposed adjacent to an outer wall of the injector cup when the clip is installed on the fuel injector; and
      a first ramp and a second ramp formed in an inner surface of each arm, the first ramp having a first slope to assist the second tabs in passing under a bottom surface of the injector cup during installation of the clip, the second ramp having a second slope which assists the installation of the clip by pushing the third tabs into engagement with the outer wall of the injector cup.

8. The apparatus as recited in claim 7, the clip further comprising a respective second tab extending from a surface of each arm in a direction of the injector cup, the respective second tabs being disposed in an opening of the injector cup when the clip is installed on the fuel injector to at least partially inhibit removal of the clip from the fuel injector.

9. The apparatus as recited in claim 7, the clip further comprising a respective barb extending from a surface of each arm into the opening, the respective barbs being positioned to engage an outer surface of the fuel injector when the clip is installed on the fuel injector to at least partially inhibit removal of the clip from the fuel injector.

10. The apparatus as recited in claim 7, the clip further comprising a U-shaped support wall extending from the clip body and the arms in a direction away from the injector cup, wherein when the clip is installed on the fuel injector, the support wall is positioned adjacent to a stem of the fuel injector to provide lateral support to the fuel injector.

11. The apparatus as recited in claim 7, wherein the fuel injector includes cutout grooves formed on two sides of the fuel injector stem, the clip further comprising pointed tips on the arms to enable the arms to pass through the cutout grooves, the arms of the clip engaging the cutout grooves to inhibit movement of the clip in an axial direction of the fuel injector.

12. A clip for a fuel injector, wherein the fuel injector is rotated following insertion into an injector cup to retain the fuel injector in the injector cup, the fuel injector having a first alignment slot and the injector cup having a second alignment slot, the clip comprising:

a clip body with a pair of arms extending from the clip body to form an opening between the arms so that the clip is U-shaped in a plan view;

a first tab extending from the clip body and into the opening;

at least one element extending from a surface of at least one of the arms in a direction of the injector cup, wherein when the clip is installed on the fuel injector, the first tab is located in the first and second alignment slots, preventing relative rotation between the fuel injector and the injector cup, and the at least one element contacts a wall of the injector cup to at least partially inhibit removal of the clip from the fuel injector; and a U-shaped support wall extending from the clip body and the arms in a direction away from the injector cup, wherein when the clip is installed on the injector, the support wall is positioned adjacent to a stem of the fuel injector to provide lateral support to the fuel injector.

13. The clip as recited in claim 12, wherein the at least one element comprises a pair of second tabs extending from the pair of arms, respectively, in the direction of the injector cup, the second tabs being disposed in an opening of the injector cup when the clip is installed on the fuel injector to at least partially inhibit removal of the clip from the fuel injector.

14. The clip as recited in claim 12, wherein the at least one element comprises a pair of second tabs extending from ends of the pair of arms, respectively, in the direction of the injector cup, the second tabs being disposed to contact an outer wall of the injector cup when the clip is installed on the fuel injector to at least partially inhibit removal of the clip from the fuel injector.

15. The clip as recited in claim 12, wherein the at least one element comprises a pair of second tabs extending from the pair of arms, respectively, in the direction of the injector cup, and a pair of third tabs extending from ends of the pair of arms, respectively, in the direction of the injector cup, wherein, when the clip is installed on the fuel injector, the second tabs are disposed inside of the injector cup in an opening of the injector cup, and the third tabs are disposed to contact an outer wall of the injector cup so that second tabs provide restraints on an inner wall of the injector cup and the third tabs provide restraints on the outer wall of the injector cup to at least partially inhibit removal of the clip from the fuel injector.

16. The clip as recited in claim 15, further comprising a first ramp and a second ramp formed on a surface of each arm toward the opening, the first ramp having a first slope which assists the second tabs in passing under a bottom surface of the injector cup during installation of the clip, the second ramp having a second slope which assists the installation of the clip by pushing the third tabs into engagement with the outer wall of the injector cup.

* * * * *